United States Patent [19]

Hirs

[11] 4,202,552
[45] May 13, 1980

[54] HEAT SHIELD AND APPARATUS COMPRISING SAME

[75] Inventor: Gilles G. Hirs, Bensberg-Herkenrath, Fed. Rep. of Germany

[73] Assignee: B.V. Neratoom, The Hague, Netherlands

[21] Appl. No.: 872,878

[22] Filed: Jan. 27, 1978

[30] Foreign Application Priority Data

Feb. 11, 1977 [NL] Netherlands .......................... 7701481

[51] Int. Cl.² .......................... F04B 39/00; F16J 15/54
[52] U.S. Cl. .................................. 277/26; 165/DIG. 6; 415/178; 417/373
[58] Field of Search ................ 417/373, 901; 415/178; 165/DIG. 6; 228/59; 277/22, 26

[56] References Cited

U.S. PATENT DOCUMENTS

| | | | |
|---|---|---|---|
| 1,857,961 | 5/1932 | Lamb | 277/26 |
| 2,622,417 | 12/1952 | Brown et al. | 415/178 |
| 2,885,963 | 5/1959 | Ivanoff | 417/373 X |
| 2,959,133 | 11/1960 | Erwin | 417/373 |

FOREIGN PATENT DOCUMENTS 590139   7/1947   United Kingdom ...................... 277/26

*Primary Examiner*—Leonard E. Smith
*Attorney, Agent, or Firm*—Kenyon & Kenyon

[57] ABSTRACT

A heat shield, for example, for a pump for liquid sodium, formed so that the space between the shield and a wall can be optimally sealed during operation. The heat shield thus retains more radiant heat and prevents a disturbance of a rotation-symmetrical thermal condition. To achieve the object, the heat shield, in one form, consists of two layers of materials having different coefficients of expansion, and in an alternative form, of two parts the spacing between which can be adjusted by mechanical means in a pivoting manner.

2 Claims, 5 Drawing Figures

HEAT SHIELD AND APPARATUS COMPRISING SAME

This invention relates to a heat shield.

Heat shields are much used technological expedients in apparatus in which certain parts are to be protected from being overheated. As an example apparatus for pumping or stirring hot liquids, comprising a cylindrical vessel or housing and a rotatable shaft for driving the stirring or pumping member. The hot liquid is present in the lower part of the housing. In the upper part of the housing, one or more heat shields are mounted, which protect the parts present in the upper part of the housing, such as bearings, from the heat from the hot liquid. A more concrete example of such apparatus is a pump for liquid sodium, which is used in the cooling system of sodium-cooled nuclear reactors.

In connection with the stringent safety requirements imposed upon the construction of nuclear reactors, it is of great importance that the temperature of the liquid sodium in the sodium pump is reduced towards the upper end of the pump. This temperature reduction is effected in the first place as a result of the fact that the heat shields retain the radiant heat emitted by the sodium. The heat shields are disposed at an angle to the normal to the wall to enable condensed sodium to flow off, and gaps are present between the heat shields and the wall of the housing, and between the shields and the shaft, which gaps are necessary to enable assembly and disassembly and rotation of the shaft, respectively. Through these gaps, a natural convection occurs, which is non-rotation-symmetrical. As a consequence, there is an instability in the rotation-symmetrical thermal condition, the latter being aimed at to prevent bending of the shaft and buckling of the housing. Such non-rotation-symmetrical natural convection occurs in particular when the shaft is not rotating or when the level of the free sodium surface is lowered. The explanation is that, on the one hand, a stationary shaft, unlike a rotating shaft, has no mixing effect, and on the other hand, when the level of the sodium surface is lowered, a gas is introduced at the top of the pump housing for replenishment, which disturbs a rotation-symmetrical thermal condition.

It is an object of the present invention to provide a heat shield which prevents disturbance of the rotation-symmetrical thermal condition, thereby to minimize the risks of bending of the shaft and buckling of the housing.

This object is realized in the heat shield according to the present invention in that it consists of at least two annular and/or substantially frusto-conical parts, such that optimum sealing between the heat shield and a wall can be achieved during operation.

In preferred embodiments of the heat shield according to the invention the shield comprises at least two layers of materials having different coefficients of expansion, or two substantially frusto-conical parts, the spacing between which can be adjusted in a pivoting manner by mechanical means. It is also possible, and, depending on the system, advantageous, for such heat shields to be of corrugated form. In cylindrical apparatus, the heat shields according to the present invention are preferably of conical shape.

According to a different embodiment of a heat shield according to the present invention, the heat shield comprises a plate member having a circular circumference and an annular member that can be placed on said plate member and is cut through at one or more places, preferably one place, and consists at least in part of such materials of different coefficients of expansion that optimum sealing between the surrounding wall and the annular member can be achieved during operation. The cross-sectional configuration of the annular member may be L-shaped, but is preferably U-shaped, the web portion of the U-section consisting of two layers of different co-efficients of expansion, and constituting the outer circumference of the circle described by the annular member.

Preferably, the heat shields are secured to a cylindrical wall, with which they can be brought into or out of the relevant apparatus in a simple manner.

Some embodiments of the invention will now be described, by way of example, with reference to the accompanying drawings. In said drawings, FIG. 1 shows a cross-sectional view of a portion of a frusto-conical heat shield consisting of two layers of materials having different coefficients of expansion;

Figure 1:
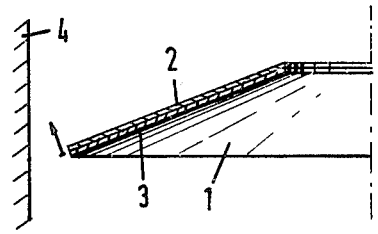

Referring to the drawings, FIG. 1 shows a cross-sectional view of a portion of a frusto-conical heat shield 1, consisting of two layers 2 and 3 of materials having different coefficients of expansion. When the temperature increases, the gap between the heat shield and wall 4 can be narrowed owing to the fact that the angle which the heat shield makes with the normal to the wall becomes smaller as a consequence of the different expansion of the layers constituting the heat shield. The change in position of the heat shield is indicated by an arrow in FIG. 1. It is clear that the situation shown in FIG. 1 requires layer 3 to have a higher coefficient of expansion than layer 2.

Figure 2:
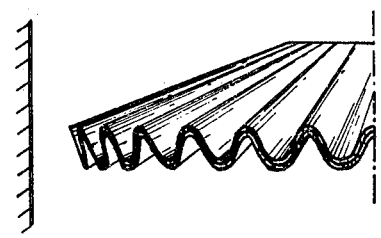
FIG. 2 shows an elevational view of a portion of a frusto-conical heat shield consisting of two layers of materials having different coefficients of expansion and of corrugated form.

FIG. 2 shows an elevational view of a portion of a frusto-conical heat shield consisting of two layers of materials having different coefficients of expansion and being of corrugated form. Such a corrugated heat shield is more flexible that that shown in FIG. 1, but for the rest is analogous in operation.

Figure 3:
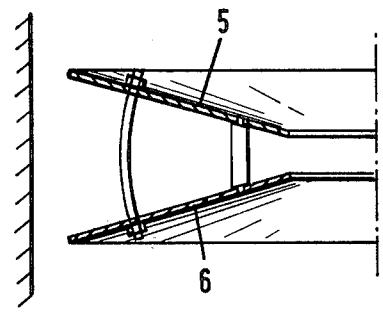
FIG. 3 shows a cross-sectional view of a portion of a heat shield consisting of two frusto-conical plates, the spacing between the ends of which can be adjusted by mechanical means.

FIG. 3 shows a cross-sectional view of a portion of a heat shield consisting of two frusto-conical plates 5 and 6, the spacing between the ends of which can be adjusted in a pivoting manner by mechanical means. When the spacing is reduced, the gap between the heat shield and the wall is narrowed.

Figure 4:
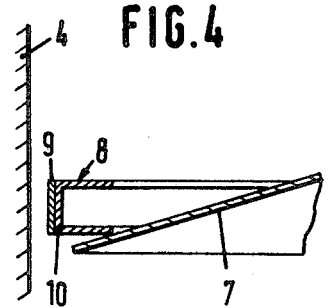
FIG. 4 shows a cross-sectional view of a portion of a frusto-conical heat shield with an annular member superposed thereon.

FIG. 4 shows a cross-sectional view of a portion of a frusto-conical heat shield 7, on which an annular member 8, cut through in one position, and having a U-shaped cross-sectional configuration, is placed. The web portion of the U-section consists of two layers 9, 10 of materials having different coefficients of expansion. When layer 9 consists of a material having a lower coefficient of expansion than the material which layer 10 is made of, a rise in temperature will cause the gap between the annular member 8 and wall 4 to be narrowed.

Figure 5:
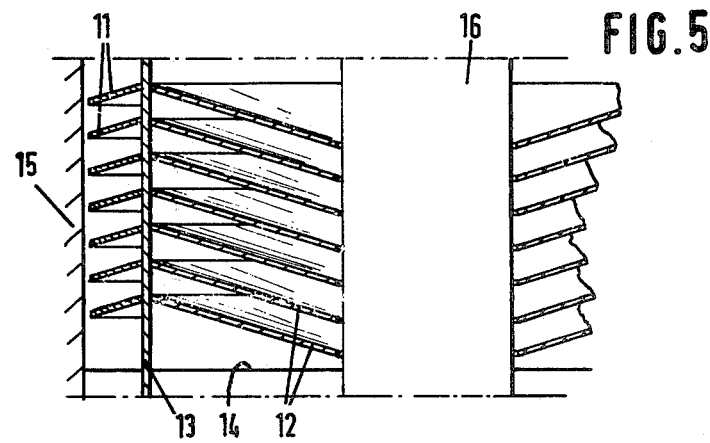
FIG. 5 shows a portion of a pump for liquid sodium in axial cross-section.

FIG. 5 shows a portion of a pump for liquid sodium in axial cross-section. This Fig. shows a plurality of heat shields 11 according to the present invention and other heat shields 12, secured to a cylindrical wall 13 in superposition to a sodium surface 14. Disposed in the central portion of the cylindrical housing having wall 15 is a rotatable shaft 16. The gaps between shaft 16 and the heat shields 12 must not be sealed in order not to prevent rotation of the shaft. The heat shields 11 may be formed in accordance with different embodiments of the present invention, those consisting of two layers having different coefficients of expansion being particularly suitable.

The heat shields according to the present invention can be used in many kinds of apparatus. Besides a pump for liquid sodium, mentioned by way of example, other pump devices and stirrers for hot liquids are conceivable, in which the heat shields according to this invention can be used with advantage.

Mostly such apparatus will be cylindrical, so that conical heat shields, in particular, will be suitable. The form of the heat shield, however, is not essential to the underlying concept of the invention. Square or rectangular heat shields are accordingly possible, provided they are secured so that the heat shield is capable of performing a pivoting movement to reduce its distance to a wall.

I claim:

1. A heat shield for mounting in closely-spaced relation to a circumscribing wall, the heat shield comprising a frusto-conical plate having a circular circumference and two concentric annular parts having different coefficients of thermal expansion, the parts being united to form a unitary element of which one part, having the lower coefficient of expansion, is arranged outside the other part so that decreased spacing between the heat shield and a circumscribing wall can be achieved during operation at elevated temperature, said two annular parts being formed as a bimetallic ring placed on said plate, said ring being cut through in one position.

2. A heat shield according to claim 1, wherein said ring is of U-shaped cross-sectional configuration, said two annular parts constituting the web portion of the U-section.

* * * * *